US010382456B2

United States Patent
Frost et al.

(10) Patent No.: US 10,382,456 B2
(45) Date of Patent: Aug. 13, 2019

(54) REMOTE COMPUTING SYSTEM PROVIDING MALICIOUS FILE DETECTION AND MITIGATION FEATURES FOR VIRTUAL MACHINES

(71) Applicant: Citrix Systems, Inc., Fort Lauderdale, FL (US)

(72) Inventors: Simon Frost, Bucks (GB); Robert Dobson, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 185 days.

(21) Appl. No.: 15/268,730

(22) Filed: Sep. 19, 2016

(65) Prior Publication Data

US 2018/0083984 A1    Mar. 22, 2018

(51) Int. Cl.
*G06F 21/00* (2013.01)
*H04L 29/06* (2006.01)
(Continued)

(52) U.S. Cl.
CPC ...... *H04L 63/1416* (2013.01); *G06F 9/45558* (2013.01); *H04L 63/1408* (2013.01); *H04L 67/025* (2013.01); *H04L 67/10* (2013.01); *H04L 67/14* (2013.01); *H04L 67/28* (2013.01); *H04L 67/42* (2013.01); *G06F 2009/45587* (2013.01); *G06F 2009/45591* (2013.01); *G06F 2009/45595* (2013.01)

(58) Field of Classification Search
CPC ..... H04L 63/1416; H04L 67/10; H04L 67/42; G06F 9/45558; G06F 2009/45595; G06F 2009/45591; G06F 2009/45587
See application file for complete search history.

(56) References Cited

U.S. PATENT DOCUMENTS 8,656,482 B1   2/2014   Tosa et al.
9,069,438 B2   6/2015   Sharp et al.
(Continued)

FOREIGN PATENT DOCUMENTS

WO    WO-2015183118 A1 * 12/2015 ......... H04L 63/0227

OTHER PUBLICATIONS

Chaimae Saadi, Habiba Chaoui; "A new approach to mitigate security threats in cloud environment"; Mar. 2017; ICC '17: Proceedings of the Second International Conference on Internet of things, Data and Cloud Computing; Publisher: ACM; pp. 1-7 (Year: 2017).*

(Continued)

*Primary Examiner* — Kendall Dolly
*Assistant Examiner* — Courtney D Fields
(74) *Attorney, Agent, or Firm* — Allen, Dyer, Doppelt + Gilchrist, PA

(57) ABSTRACT

A computing device may include a memory and a processor cooperating therewith to operate a plurality of virtual computing sessions for a plurality of client devices. Each of the virtual computing sessions may have access to a network. The processor may further operate at least one security agent configured to detect security threats from the virtual computing sessions, and a virtual management agent configured to, responsive to detection of a security threat from a given virtual computing session, discontinue access to the computing network by the given virtual computing session.

15 Claims, 10 Drawing Sheets

(51) Int. Cl.
 G06F 9/455 (2018.01)
 H04L 29/08 (2006.01)
 G06F 9/44 (2018.01)
 G06F 21/53 (2013.01)
 G06F 21/57 (2013.01)

(56) References Cited

U.S. PATENT DOCUMENTS

| | | |
|---|---|---|
| 2014/0053226 A1 | 2/2014 | Fadida et al. |
| 2015/0040228 A1 | 2/2015 | Lee et al. |
| 2016/0232024 A1* | 8/2016 | Hamilton, II ....... G06F 9/45558 |
| 2016/0283259 A1* | 9/2016 | Mehta ................. G06F 9/45558 |
| 2017/0180394 A1* | 6/2017 | Crofton ................. H04L 63/145 |

OTHER PUBLICATIONS

Rob Dobson "A Revolutionary Approach to Advanced Malware Protection" https://www.citrix.com/blogs/2016/06/21/a-revolutionary-approach-to-advanced-malware-protection/ pp. 8, Jun. 21, 2016.
"Session virtualization and app virtualization with XenApp" https://www.citrix.com/products/xenapp-xendesktop/application-virtualization.html: pp. 3. Retrieved from internet Oct. 25, 2016.

* cited by examiner

REMOTE COMPUTING SYSTEM PROVIDING MALICIOUS FILE DETECTION AND MITIGATION FEATURES FOR VIRTUAL MACHINES

TECHNICAL FIELD

This disclosure relates to computer networks and remote computing, and more particularly to security measures for remote computing and desktop environments and related methods.

BACKGROUND

Malicious computer programs (also know as malware) such as viruses, worms, root kits, ransomware and the like, continue to grown in sophistication and affect computers around the world. Security vendors have developed increasingly sophisticated security software that aims to protect computers by trying to find known malicious files. Malware needs to find a vehicle into the system. Typically, this would be a foreign file (downloaded, received by email, copied from a USB stick, etc.) that resides on the system's disk. Therefore, the security software inspects each file that pops up on the system, and tries to figure out if it is bad (i.e., will do something malicious). The security software typically carries out the scanning and remediation using a global list of known bad signatures for files that have already been seen and are known to be malicious.

If malware is detected on a regular desktop computing environment, then it may be dealt with locally, with mitigations applied just on that machine. However, in a Virtual Desktop Infrastructure (VDI) or Server Based Computer (SBC) environment, a user desktop session typically runs inside a server (e.g., on a virtual machine) in a remote datacenter. There may be multiple users currently accessing the same environment who may all be impacted by malware from one user desktop session. Moreover, there are respective client machines connected to the server for each of the virtual machines, which extends the potential attack surface for the malware.

SUMMARY

A computing device may include a memory and a processor cooperating therewith to operate a plurality of virtual computing sessions for a plurality of client devices. Each of the virtual computing sessions may have access to a network. The processor may further operate at least one security agent configured to detect security threats from the virtual computing sessions, and a virtual management agent configured to, responsive to detection of a security threat from a given virtual computing session, discontinue access to the computing network by the given virtual computing session.

The virtual management agent may be further configured to, responsive to detection of the security threat from the given virtual computing session by the at least one security agent, suspend all of the virtual computer sessions. Furthermore, the processor may further operate a hypervisor to run a virtual machine, the given virtual computing session may run on the virtual machine, and the virtual management agent may be configured to, responsive to detection of the security threat from the given virtual computing session by the at least one security agent, place the virtual machine into a maintenance mode in which it is inaccessible to the client devices. Furthermore, the virtual machine may run based upon a virtual disk, and the virtual management agent may be further configured to, responsive to detection of the security threat from the given virtual computing session by the at least one security agent, restore the virtual disk to a version thereof created prior to a time of detection of the security threat.

The virtual management agent may be further configured to, responsive to detection of the security threat from the given virtual computing session by the at least one security agent, discontinue access to the memory by the given virtual computing session. The processor may further be configured to operate at least one session recording agent, and the virtual management agent may be further configured to, responsive to detection of the security threat from the given virtual computing session by the at least one security agent, enable the at least one session recording agent to record the given virtual computing session.

In addition, each of the client devices may operate a respective client security agent thereon, and the virtual management agent may be further configured to, responsive to detection of the security threat from the given virtual computing session by the at least one security agent, cause the client security agent on the client device associated with the given virtual computing session to perform a security scan. Furthermore, the processor may also be configured to operate a respective Internet browser agent on each of the virtual computing sessions, and the virtual management agent may be further configured to, responsive to detection of the security threat from the given virtual computing session by the at least one security agent, block access to a URL path active at the internet browser agent on the given virtual computing session at a time of detection of the security threat.

In addition, the virtual management agent may further be configured to store an image of the given virtual computing session in the memory responsive to detection of the security threat from the given virtual computing session by the at least one security agent. Also, the at least one security agent may comprise a common security agent to detect security threats across all of the virtual computing sessions.

A related method for using a computing device, such as the one described briefly above, may include operating a plurality of virtual computing sessions on the computing device for a plurality of client devices, with each of the virtual computing sessions having access to a network. The method may further include, operating at least one security agent on the computing device to detect security threats from the virtual computing sessions, and operating a virtual management agent on the computing device to, responsive to detection of a security threat from a given virtual computing session, discontinue access to the computing network by the given virtual computing session.

A related non-transitory computer-readable medium may have computer-executable instructions for causing a computing device, such as the one described briefly above, to perform steps including operating a plurality of virtual computing sessions for a plurality of client devices, where each of the virtual computing sessions has access to a network. The steps may further include operating at least one security agent to detect security threats from the virtual computing sessions, and operating a virtual management agent to, responsive to detection of a security threat from a given virtual computing session, discontinue access to the computing network by the given virtual computing session.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1A:
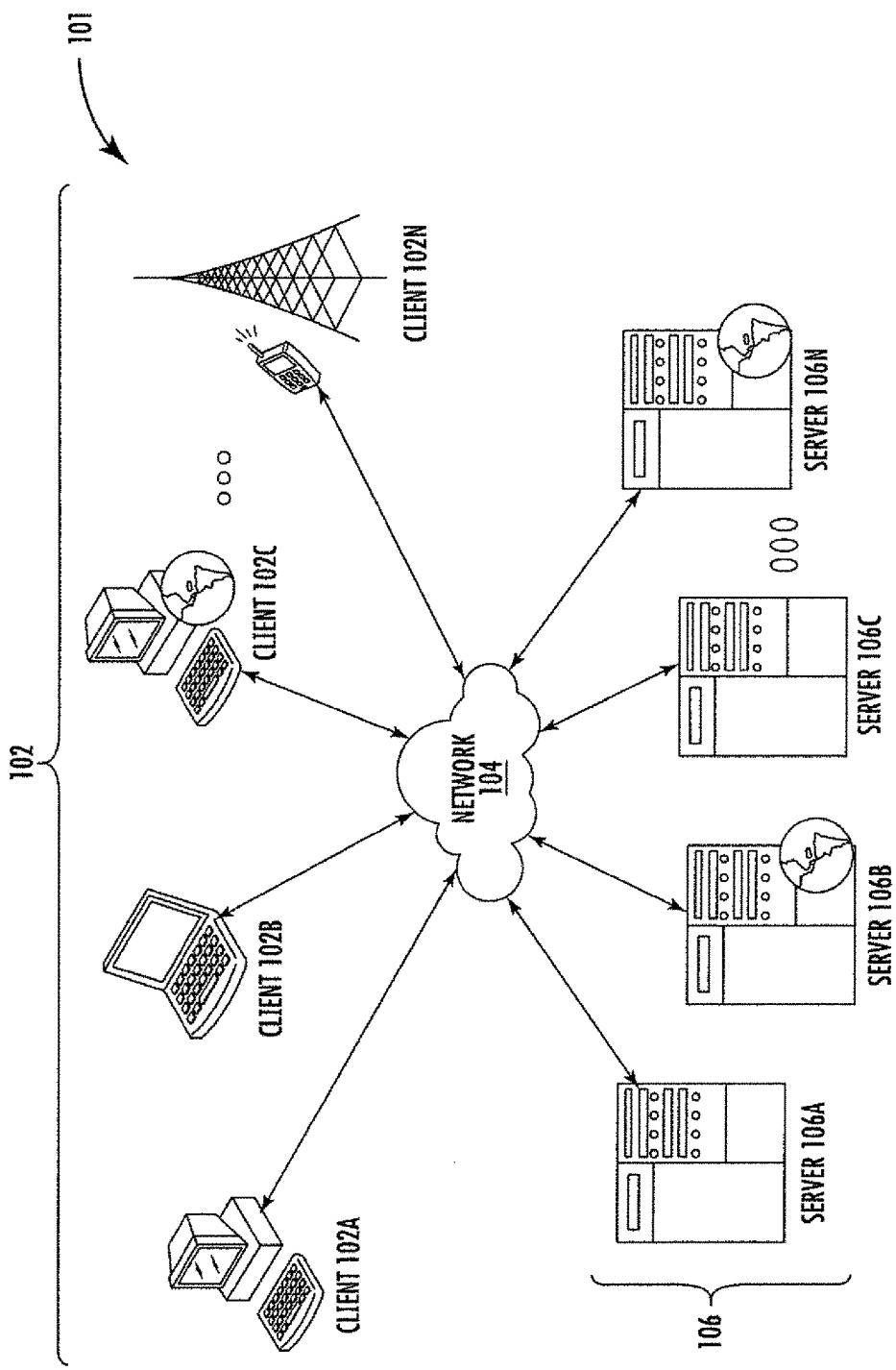
FIG. 1A is a schematic block diagram illustrating a network environment that provides remote access to computing devices that may execute application programs in accordance with an example embodiment.

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiments be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over Internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
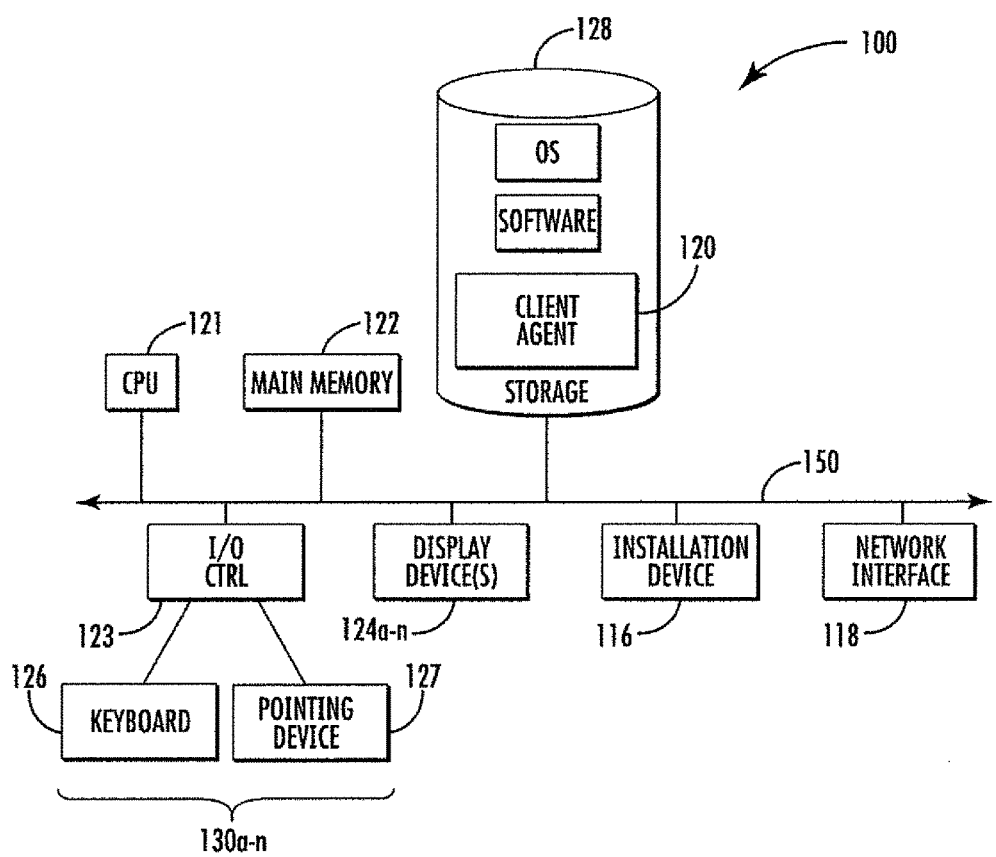
FIG. 1B and FIG. 1C are schematic block diagrams that depict embodiments of computing devices that may be used with the network environment of FIG. 1A.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
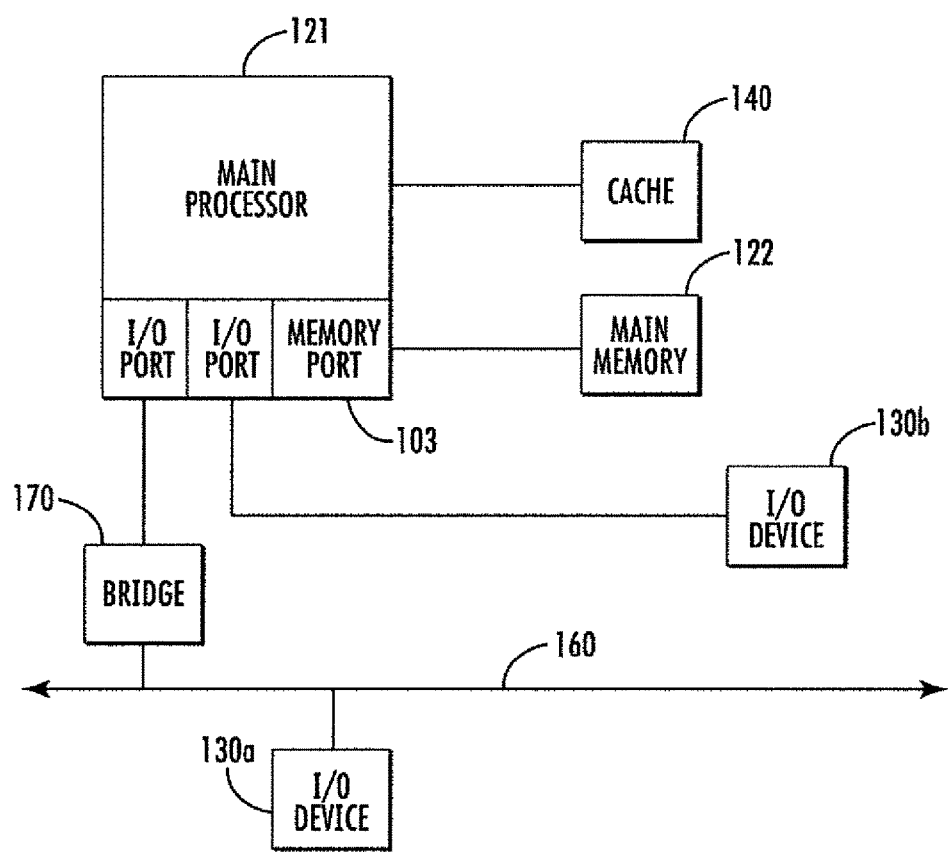

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (not shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. Relevant WINDOWS systems for a client machine may include: WINDOWS CE; WINDOWS XP; WINDOWS VISTA; WINDOWS 7; WINDOWS 8; WINDOWS 8.1; and WINDOWS 10. In some embodiment, clients may also be allowed to run on the server OS, such as WINDOWS Servers 2008, 2008R2, 2012, 2012R2, 2016. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the TPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, 195c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc.; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone or iPad manufactured by Apple Computer; Palm Pre; a Pocket PC; a Pocket PC Phone; multiple manufacturers phones/tablets/laptops powered by Android, WINDOWS CE, WINDOWS 10 Mobile, WINDOWS Phone, Chrome OS powered devices (e.g., Chromebooks, etc.) or any other handheld mobile device.

Figure 2:
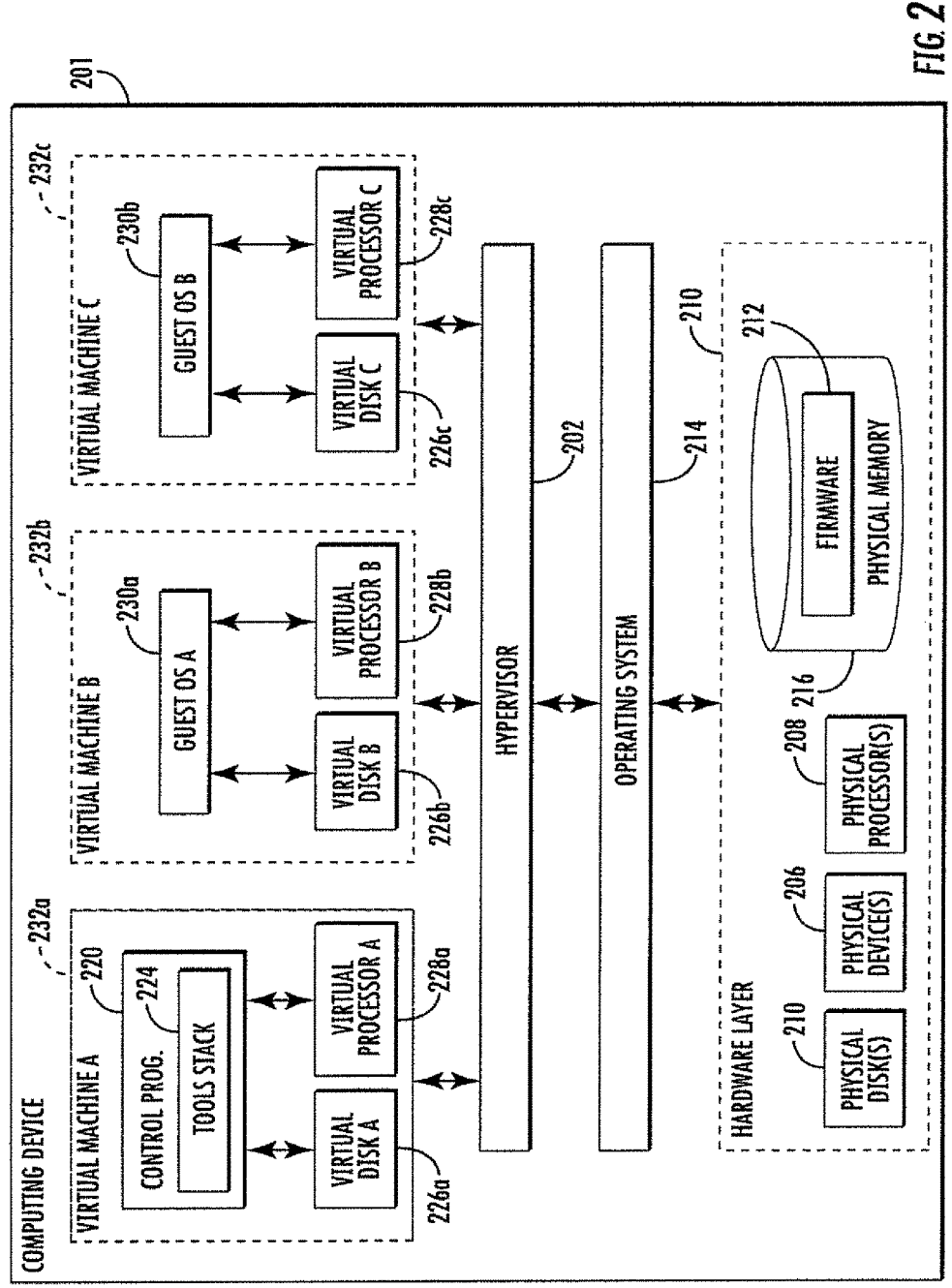
FIG. 2 is a schematic block diagram of a virtualization environment and computing device that may be used in accordance with an example embodiment.

Illustrated in FIG. 2 is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

In the embodiment illustrated in FIG. 2, the virtualization environment includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2 illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2 illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device201. In some embodiments, the firmware 212 can be boot firmware such as the basic input/output system (BIOS). Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2 illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2 illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others such as a Kernel-based Virtual Machine (KVM) hypervisor and Acropolis from Nutanix. In some embodiments, a computing device 201 executes a hypervisor 202 that creates a virtual machine platform on which guest operating systems may execute. In these embodiments, the computing device 201 can be referred to as a host server. An example of such a computing device is the XENSERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U. A virtual machine 232 is a set of executable instructions that, when executed by a processor 208, imitate the operation of a physical computer such that the virtual machine 232 can execute programs and processes much like a physical computing device. In one example embodiment, the computing device 201 hosts three virtual machines 232, but in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom 0. The control program 220, in some embodiments, can be DOMAIN o or DOM 0 of the XEN hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (not shown) on a first computing device 201A (not shown) may exchange data with a control program 220B (not shown) on a second computing device 201B (not shown). In these embodiments the first computing device 201A may be located remote from the second computing device 201B. The control programs 220A-B can exchange data via a communication link between a hypervisor 202A (not shown) executing on the first computing device 201A and a hypervisor 202B (not shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine" In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine" In another embodiment, a paravirtualized machine includes additional drivers that a fully-virtualized machine does not include. In still another embodiment, the paravirtualized machine includes the network back-end driver and the block back-end driver included in a control program 220, as described above.

Figure 3:
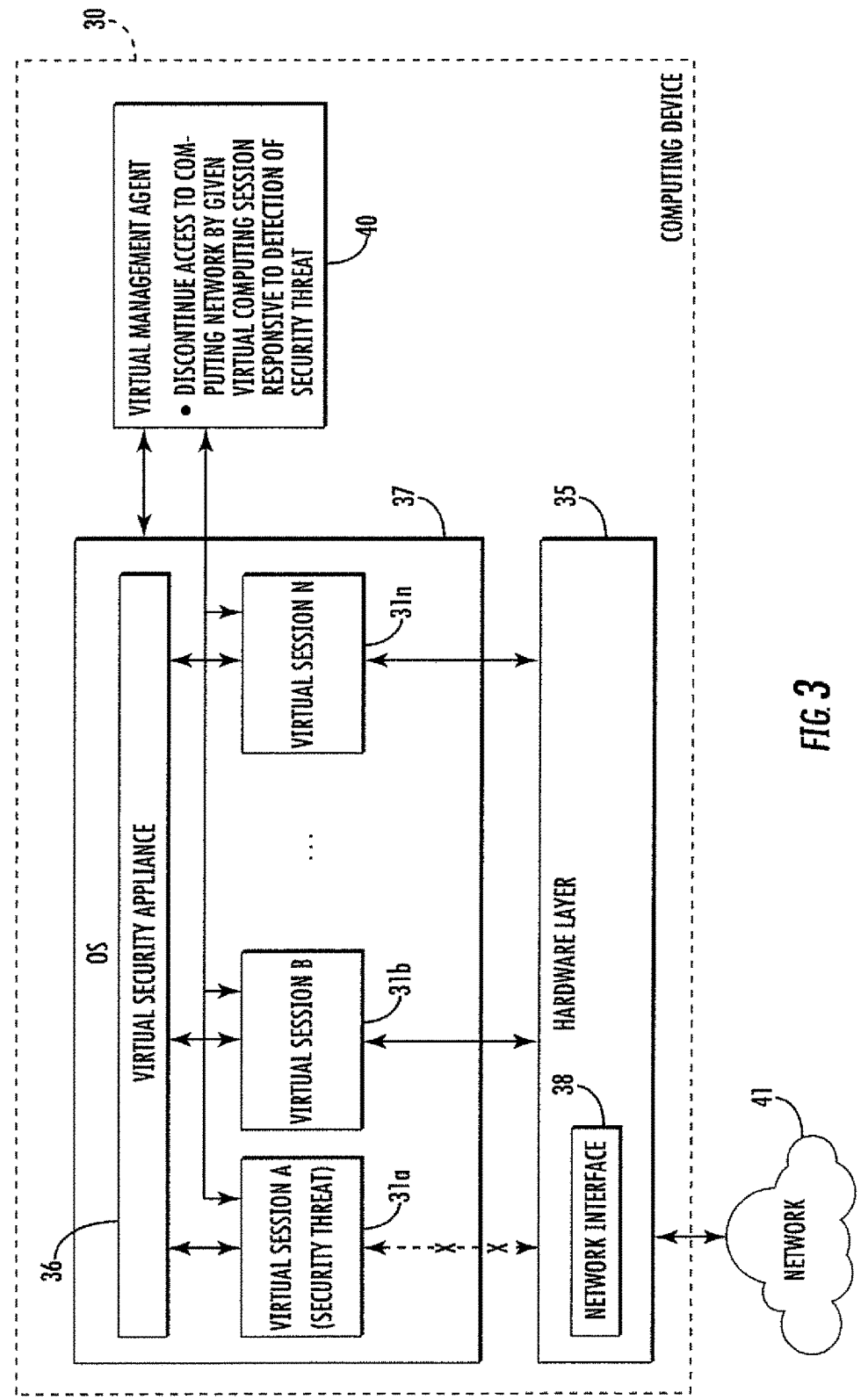
FIGS. 3-6 are schematic block diagrams of a computing device providing security threat detection and mitigation for virtual computing environments in accordance with example embodiments.
Figure 7:
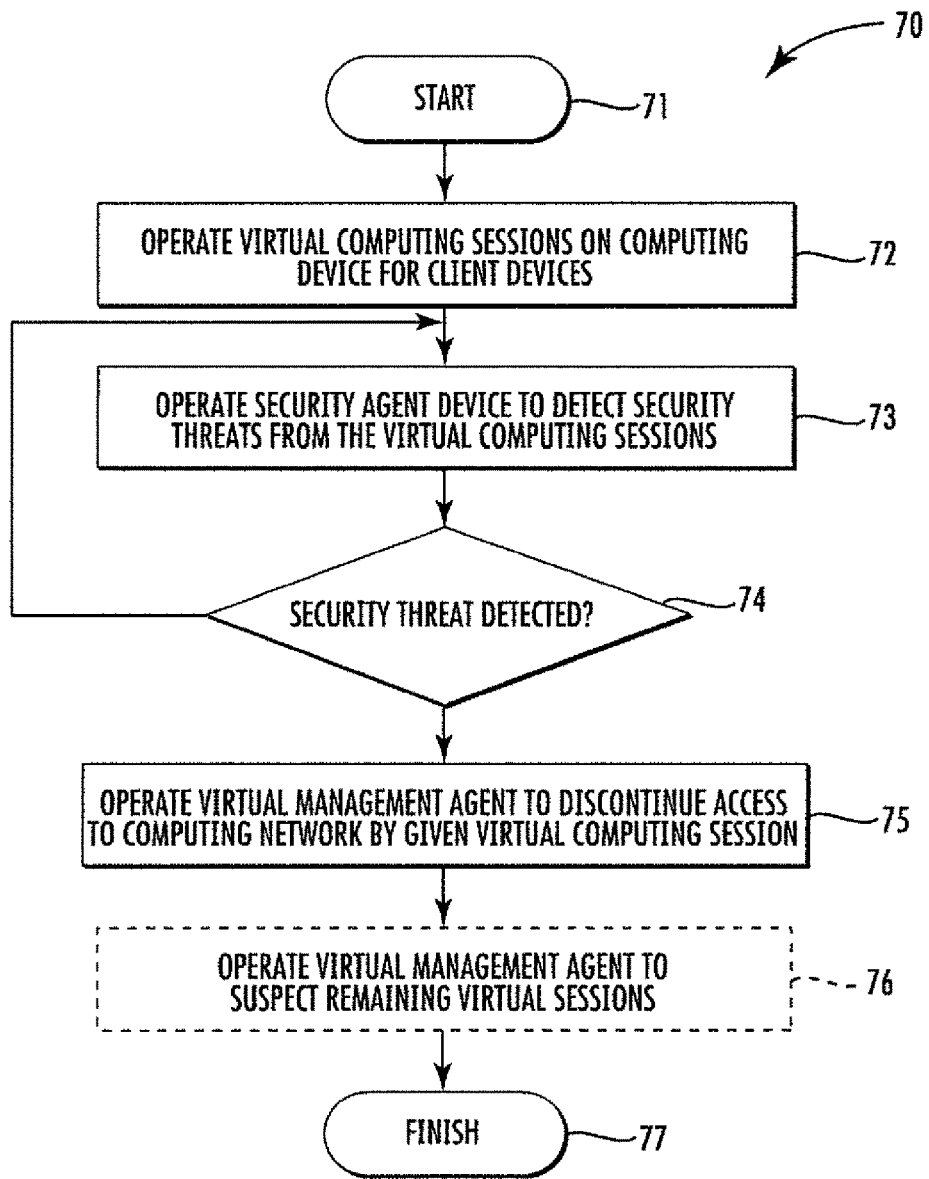
FIGS. 7 and 8 are flow diagrams illustrating method security threat detection and mitigation aspects which may be used with the computing devices of FIGS. 3-6.

Turning now to FIG. 3 and the flow diagram 70 of FIG. 7, various approaches for dealing with security threats in virtual computing sessions are now described. By way of example, such security threats may include the "infection" of a virtual session by malicious files, or malware, including viruses, worms, root kits, ransomware and the like, for example. However, security threats need not always involve a malicious file download, but may also take the form of an attack from an external source attempting to gain access to a network computing device, or a case in which a webserver returns a malicious payload to make use of a browser vulnerability. The technical advantages provided by the security threat mitigation techniques described herein are accordingly unique to a computing environment, and more particularly a virtual computing environment, since they involve attacks via malicious computer files and network interfaces to surreptitiously access virtual computing sessions and associated computer hardware.

In the example of FIG. 3, a computing device 30 is shown which may include similar components to those described above. As such, in the following examples only those components which are pertinent for explaining the various security threat mitigation techniques are shown for clarity of illustration.

In the present example, the computing device 30 is configured for a server based computing (SBC)/hosted application implementation. The computing device 30 illustratively includes a hardware layer 35 including a network interface 38. Beginning at Block 71, the computing device 30 further operates an OS 37 which runs a plurality virtual computing sessions 31a-31n, at Block 72, as well as a virtual security appliance or agent 36. The computing device 30 may be a physical machine providing the virtual computing sessions 31a-31n which are shared by multiple users/client devices, or in some embodiments a hypervisor (not shown in FIG. 3) may be incorporated with the OS 37 to operate one or more virtual machines which, in turn, run the virtual computing sessions 31a-31n for the different users/client devices. The techniques described herein may also be used with a virtual desktop infrastructure (VDI), such as the one shown in FIG. 2, in which the virtual machines 232 may operate respective virtual sessions for different client devices.

In the illustrated example, the virtual security appliance 36 is a common security agent which detects the presence of security threats, such as malicious files or other attacks, emanating from all of the virtual sessions 31a-31n, at Block 73. That is, the virtual security appliance 36 runs at the OS level for the computing device 30, or alternatively at the hypervisor level in a virtual machine configuration, to enforce hardware-level protection. Respective security appliances or agents may also be run within each of virtual sessions 31a-31n in some embodiments. The security agent or appliance may scan for malicious files based upon a global list of known bad files, as discussed above, and/or look for certain actions indicative of an attack or a malicious file being executed (e.g., mass file encryption in the case of ransomware).

In accordance with one example, the virtual security appliance 36 and the virtual sessions 31a-31n may be implemented within virtual machines using XENSERVER from the present Applicant Citrix Systems, Inc., wherein a set of application program interfaces (APIs) is provided that allows security software to use a hypervisor (not shown in FIG. 3) to improve security. These Direct Inspect APIs allow security agents to protect against real threats that traditional approaches are not equipped to deal with. More particularly, these Direct Inspect APIs advantageously allow the virtual security appliance 36 to not only protect physical memory, but also virtual machine memory, guarding against attacks that may never otherwise touch the filesystem, e.g., at the OS layer 37. That is, the APIs may allow a security appliance access to the physical memory address space allocated to a particular guest virtual machine. The hypervisor may be incorporated as part of the OS layer 37, or the OS layer and hypervisor may be separate as shown in FIG. 2 in different embodiments.

In addition, the Direct Inspect APIs may also help protect against different attack techniques. That is, instead of trying to simply find malware, the virtual security appliance 36 may block malware from ever executing. While an attacker may create different malware variants, these typically need to use the same handful of techniques to attack memory (e.g. buffer overflows, heap spray, function detouring, code injection). This means that by focusing on blocking these techniques, the virtual security appliance 36 may effectively protect against "not yet seen" (i.e., not already in an existing malware list) advanced attacks.

Another potential advantage of malware detection by the virtual security appliance 36 at the OS 37 level is that, in the event virtual machines are being used, this avoids relying on software running inside the virtual machines. Relying on software inside of virtual machines may be problematic in some instances because some malware such as rootkits may (using zero-day vulnerabilities) completely compromise the ability to tell whether a system has been infected. However, a centralized malware approach using the virtual security appliance 36 with the above-noted APIs allows protection to take place from outside the virtual sessions 31a-31n, using the OS 37 and/or hypervisor to provide hardware-enforced isolation. This means the attacker can no longer directly attack the security software. However, it should be noted that the approach described herein may be used with virtual domain controllers other than XENSEVER and without Direct Inspect APIs (e.g., using conventional malware agents). That is, while hardware-enforced protection outside of a guest virtual machine would generally be performed with a hypervisor, there are other approaches for detecting attacks that do not require the above-described APIs which may also be used with the embodiments described herein.

The computing device 30 further illustratively includes a virtual management agent 40 for the virtual sessions 31a-31n. That is, the virtual management agent 40 manages the SBC (or VDI) environment. Example management systems which may be used to implement the virtual management agent 40 and the functions thereof described below include XENAPP and XENDEKSTOP from the present Applicant Citrix Systems, Inc., although other suitable session managers may be used in different embodiments.

The virtual management agent 40 may communicate with the virtual security appliance 36, and responsive to the detection of a security threat from a given virtual session (the virtual session 31a in the present example) by the virtual security appliance 36 (Block 74), the virtual management agent may be configured to discontinue access to the computing network 41 by the virtual computing session 31a, at Block 75, as represented by the X's on the dashed data flow path between the virtual session 31a and the network interface 38. That is, upon detection of a security threat by the virtual security appliance 36 using the techniques described above, the virtual management agent 40 advantageously cuts off access by the "infected" virtual session 31a to the network 41, to thereby disconnect the virtual session from client devices and/or other network components (e.g., system memory, other computing devices connected to the network, etc.). The remaining virtual sessions 31b-31n may optionally be suspended as well, at Block 76, until the threat is addresses. The method of FIG. 7 illustratively concludes at Block 77.

Disconnecting the virtual session 31a from the network 41 allows this virtual session to be quarantined or isolated until the appropriate mitigations have been applied. More particularly, this may be done without shutting down the virtual session 31a (or virtual machine, if the virtual session is running on a virtual machine), which may advantageously preserve data being created in the session. However, in some embodiments, the virtual session 31a may be shut down to disconnect it from the network 41 if desired.

Figure 4:
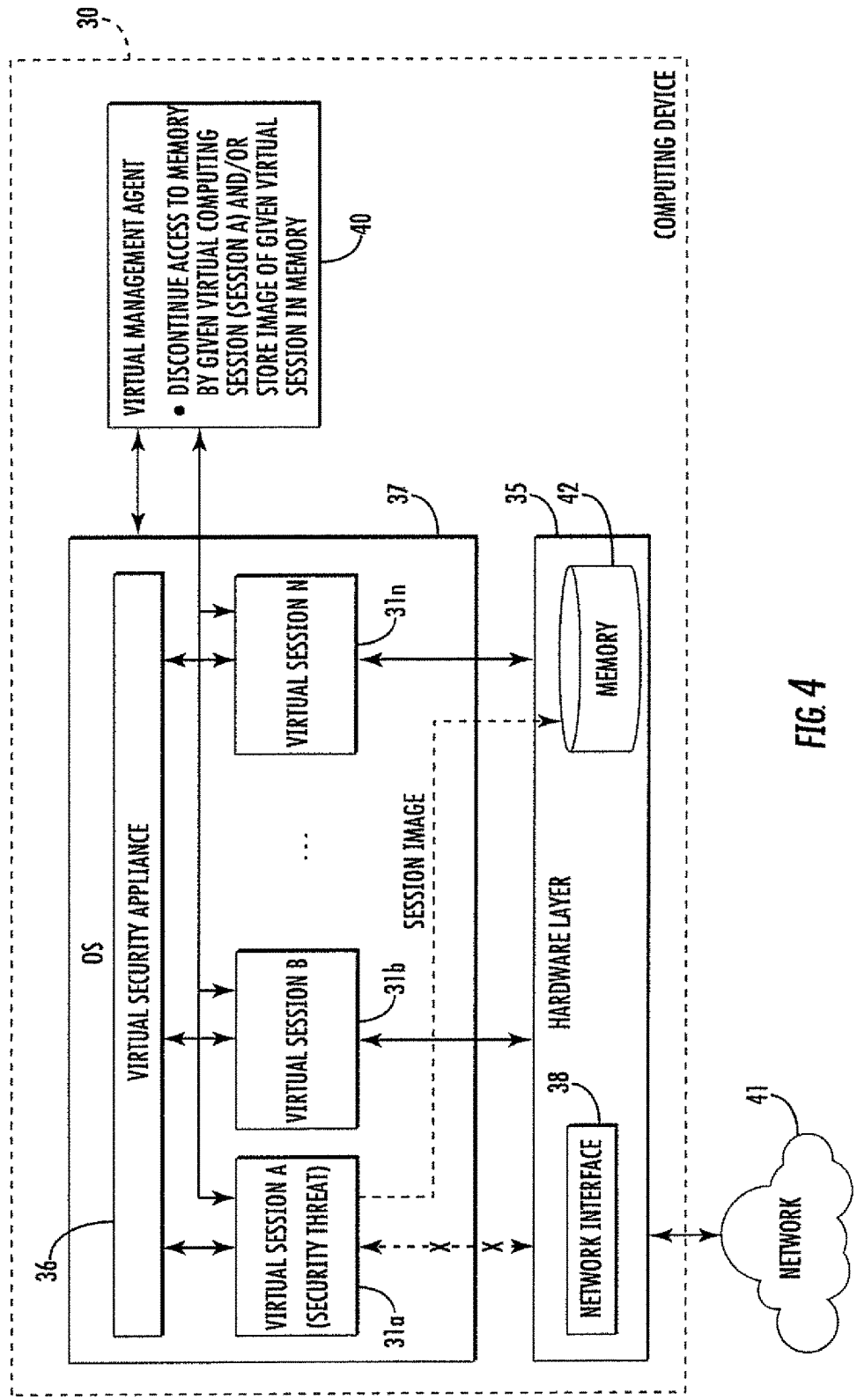

Referring additionally to FIG. 4, the virtual management agent 40 may also take further remedial measures upon the detection of a security threat from one or more of the virtual sessions 31a-31n. By way of example, the virtual management agent 40 may discontinue access to other hardware within the hardware layer 35, such as a systems memory 42 (e.g., a physical disk or physical memory as described above). Another action which may be taken is to store an image of the problematic virtual computing session (here the session 31a) in the memory 42 (or to another memory via the network 41) responsive to detection of the security threat from the given virtual computing session by the virtual security appliance 36. That is, the virtual management agent 40 may cause the OS 37 (and/or hypervisor in some embodiments) to memory snapshot the affected virtual computer session to advantageously carry out post-attack forensics/attack replay, for example, if desired. In accordance with one example virtual machine implementation, if the virtual machine is set up to obtain its disk via a provisioning service such as Citrix Provisioning Services (PVS) that streams a copy of the image to the virtual machine at boot time, then the virtual management agent 40 may further interact with the appropriate PVS component to capture the relevant disk image if the image is not persistently present.

Figure 5:
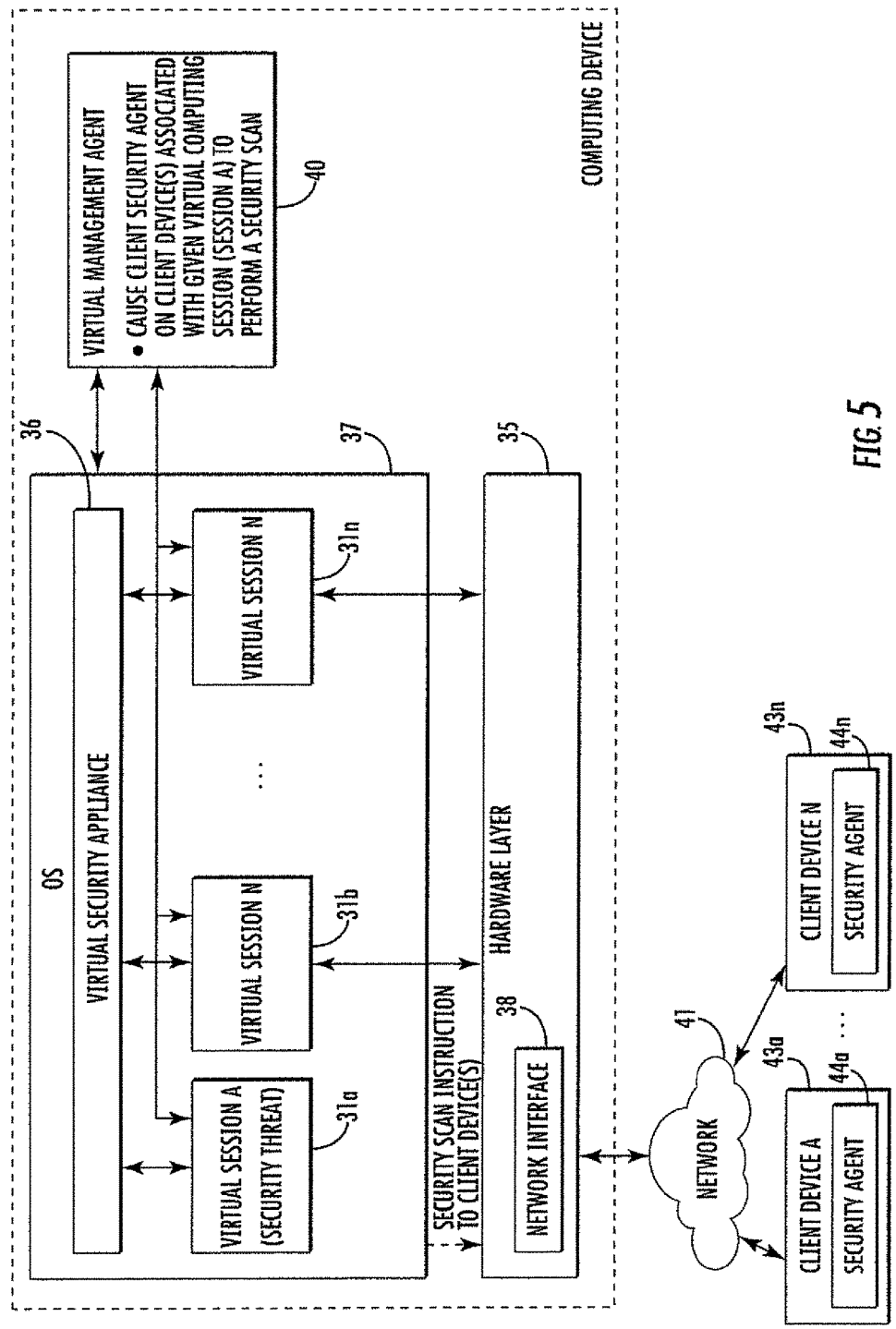

In accordance with another example shown in FIG. 5, client devices 43a-43n communicate with the virtual sessions 31a-31n via the network 41. Furthermore, each of the client devices 43a-43n has a respective security agent 44a-44n running thereon (e.g., malware/virus protection agent). The virtual management agent 40 may accordingly be configured to cause one or more of the client security agents 44a-44n on the client devices 43a-43n associated with, or in communication with, the affected virtual computing session 31a to perform a respective security scan. By arranging for further scanning for the appropriate client device(s) 43a-43n from which the virtual session 31a was accessed, this may advantageously help prevent the spread of a malicious file or attack in case the malware is aware of the environment and tries to extend the infection to the client device.

Figure 6:
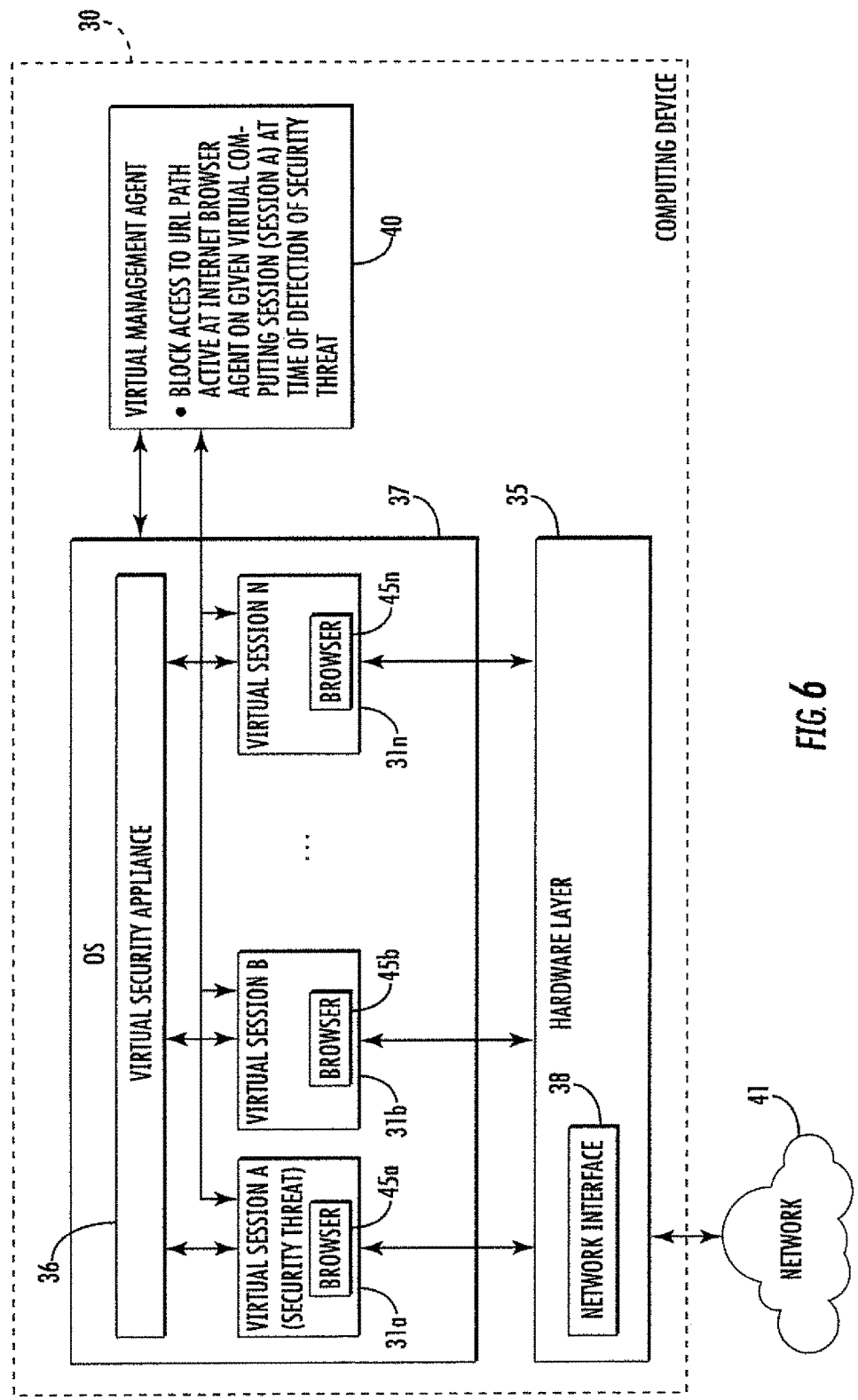

Referring now additionally to FIG. 6, another remediation action that the virtual management agent 40 may take responsive to the detection of a threat by the virtual session 31a is now described. More particularly, in the illustrated example the environment is dedicated to serving browser apps 45a-45n in respective virtual sessions 31a-31n. The virtual management agent 40 may accordingly block access to a URL path that is active at the internet browser agent 45a on the affected virtual computing session 31a at a time of detection of the security threat. Thus, if the threat came to the virtual session 31a by way of the URL in question, flagging the URL path active at the time of the infection for blocking by the virtual sessions 31a-31n may help to prevent the similar intrusion of the threat to other virtual sessions via the problematic URL.

Figure 8:
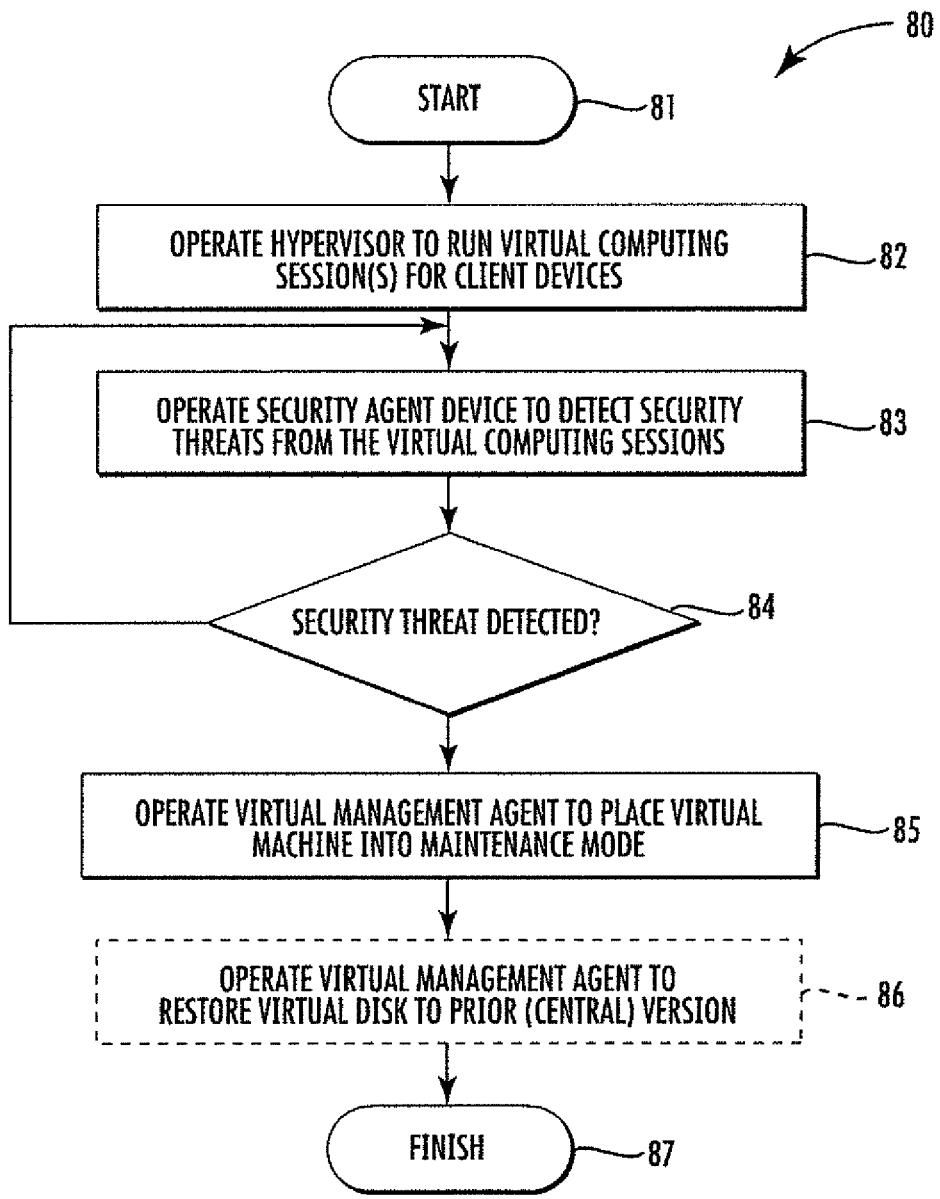

Referring additionally to the flow diagram 80 of FIG. 8, further remedial actions which may be taken by the virtual management agent 40 responsive to the detection of a security threat from virtual sessions in a virtual machine environment are now described. Beginning at Block 81, as discussed above, a hypervisor may be used to run virtual machines in either a VDI or SBC environment, and the virtual machines in turn run one or more virtual computing sessions for different client devices, at Block 82. As noted above, one or more virtual security appliances or agents may detect security threats from the virtual sessions, at Block 83, and upon detection of a security threat (Block 84), the virtual management agent 40 may place the virtual machine hosting the affected virtual computing session into a maintenance mode in which it is inaccessible to the client devices, at Block 85. This may advantageously help to ensure that the virtual machine is not re-used until it can be verified that it is problem free. For instance, the virtual management agent 40 may cause the hypervisor to restore a virtual disk associated with the virtual machine to a version thereof created prior to a time of detection of the security threat, at Block 86. By way of example, if the virtual machine is from a pooled environment where it is formed from a central image plus a differencing disk, then it may be arranged to be cleaned/recycled back to the central image to ensure any infection by malware is removed. The method of FIG. 8 illustratively concludes at Block 87.

Another mitigation action which may be taken by the virtual management agent 40 responsive to a security threat detection is to send one or more messages to the virtual session 31a to inform the appropriate user(s) of the detection situation, depending on the given implementation. Moreover, if the desktop environment is a multi-user environment, then information may be sent to other users sessions on the same server or client device, and those sessions may be disconnected or quarantined while mitigation is performed. In some example embodiments, a central helpdesk may be notified of the detection event. More particularly, a helpdesk may be setup that is specific to the desktop/app service which may not ordinarily be included in a malware notification.

Furthermore, for environments using a hypervisor including a virtual switch, the virtual management agent 40 may cooperate with the hypervisor to allow the virtual machine to continue running while blocking any outbound traffic. This may advantageously allow for the collection of more information on what the attack is trying to achieve. By way of example, auditing functionality may be provided which allows for re-routing of traffic to collect a trace of what is happening from the network layer during an attack.

The above-described devices and methods accordingly provide enhanced security threat mitigation for a virtual computing environment. This may be particularly advantageous with the introduction of remote malware scanning enabled by hypervisor environments. In such a combination environment, appropriate reactions may be taken without any interaction with the desktop environment where the malware or other security threat has been detected. It should be noted that the above-described mitigation techniques may be combined or used individually in different embodiments.

Many modifications and other embodiments will come to the mind of one skilled in the art having the benefit of the teachings presented in the foregoing descriptions and the That which is claimed is:

1. A computing device comprising:
a memory storing instructions and a processor executing the instructions to operate
a plurality of virtual computing sessions for a plurality of client devices,
a virtual security appliance configured to detect security threats from the virtual computing sessions, and
a hypervisor to run a virtual machine based upon a virtual disk, with a given one of the virtual computing sessions running on the virtual machine;
a respective internet browser agent on each of the virtual computing sessions;
a virtual management agent configured to, responsive to detection of a security threat from a the given virtual computing session, and without shutting down the given virtual computing session, block access to a URL path active at the internet browser agent on the given virtual computing session at a time of detection of the security threat to quarantine the virtual computing sessions from the URL path;
wherein the virtual management agent is further configured to, responsive to detection of the security threat from the given virtual computing session by the virtual security appliance, restore the virtual disk to a version thereof created prior to a time of detection of the security threat.

2. The computing device of claim 1 wherein the virtual management agent is further configured to, responsive to detection of the security threat from the given virtual computing session by the virtual security appliance, suspend all of the virtual computer sessions.

3. The computing device of claim 1 wherein the virtual management agent is configured to, responsive to detection of the security threat from the given virtual computing session by the virtual security appliance, and without shutting down the given virtual computing session, place the virtual machine into a maintenance mode in which it is inaccessible to the client devices.

4. The computing device of claim 1 wherein the virtual management agent is further configured to, responsive to detection of the security threat from the given virtual computing session by the virtual security appliance, and without shutting down the given virtual computing session, discontinue access to the memory by the given virtual computing session.

5. The computing device of claim 1 wherein the processor is further configured to operate at least one session recording agent; and wherein the virtual management agent is further configured to, responsive to detection of the security threat from the given virtual computing session by the virtual security appliance, and without shutting down the given virtual computing session, enable the at least one session recording agent to record the given virtual computing session.

6. The computing device of claim 1 wherein each of the client devices operates a respective client security agent thereon; and wherein the virtual management agent is further configured to, responsive to detection of the security threat from the given virtual computing session by the virtual security appliance, and without shutting down the given virtual computing session, cause the client security agent on the client device associated with the given virtual computing session to perform a security scan.

7. The computing device of claim 1 wherein the virtual management agent is further configured to store an image of the given virtual computing session in the memory responsive to detection of the security threat from the given virtual computing session by the virtual security appliance.

8. A method for using a computing device comprising:
operating a plurality of virtual computing sessions on the computing device for a plurality of client devices;
operating a virtual security appliance on the computing device to detect security threats from the virtual computing sessions;
operating a hypervisor to run a virtual machine based upon a virtual disk, with a given one of the virtual computing sessions running on the virtual machine;
operating a respective internet browser agent on each of the virtual computing sessions;
operating a virtual management agent on the computing device to, responsive to detection of a security threat from a the given virtual computing session, and without shutting down the given virtual computing session, block access to a URL path active at the internet browser agent on the given virtual computing session at a time of detection of the security threat to quarantine the given virtual computing session from the URL path; and
operating the virtual management agent to, responsive to detection of the security threat from the given virtual computing session by the virtual security appliance, restore the virtual disk to a version thereof created prior to a time of detection of the security threat.

9. The method of claim 8 further comprising operating the virtual management agent to, responsive to detection of the security threat from the given virtual computing session by the virtual security appliance, and without shutting down the given virtual computing session, discontinue access to the memory by the given virtual computing session.

10. The method of claim 8 further comprising operating the virtual management agent to, responsive to detection of the security threat from the given virtual computing session by the virtual security appliance, suspend the virtual computer sessions.

11. The method of claim 8 further comprising operating the virtual management agent to place the virtual machine into a maintenance mode in which it is inaccessible to the client devices response to detection of the security threat from the given virtual computing session by the virtual security appliance, and without shutting down the given virtual computing session.

12. A non-transitory computer-readable medium having computer-executable instructions for causing a computing device to perform execute a process including steps comprising:
operating a plurality of virtual computing sessions for a plurality of client devices;
operating a virtual security appliance to detect security threats from the virtual computing sessions;
operating a hypervisor to run a virtual machine based upon a virtual disk, with a given one of the virtual computing sessions running on the virtual machine;
operating a respective internet browser agent on each of the virtual computing sessions;
operating a virtual management agent to, responsive to detection of a security threat from a the given virtual computing session, and without shutting down the given virtual computing session, block access to a URL path active at the internet browser agent on the given virtual computing session at a time of detection of the security threat to quarantine the given virtual computing session from the URL path; and operating the virtual management agent to, responsive to detection of the security threat from the given virtual computing session by the virtual security appliance, restore the virtual disk to a version thereof created prior to a time of detection of the security threat.

13. The non-transitory computer-readable medium of claim 12 further having computer-executable instructions causing the computing device to operate the virtual management agent to, responsive to detection of the security threat from the given virtual computing session by the virtual security appliance, and without shutting down the given virtual computing session, discontinue access to the memory by the given virtual computing session.

14. The non-transitory computer-readable medium of claim 12 further having computer-executable instructions causing the computing device to operate the virtual management agent to, responsive to detection of the security threat from the given virtual computing session by the virtual security appliance, suspend the virtual computer sessions.

15. The non-transitory computer-readable medium of claim 12 further having computer-executable instructions causing the computing device to:

operate the virtual management agent to, responsive to detection of the security threat from the given virtual computing session by the virtual security appliance, and without shutting down the given virtual computing session, place the virtual machine into a maintenance mode in which it is inaccessible to the client devices.

* * * * *